March 28, 1961  J. L. SMITH  2,976,729
VOLTAGE COMPARATOR CIRCUITRY
Filed June 30, 1958

INVENTOR.
JAMES L. SMITH
BY Miketta and Glenny
ATTORNEYS.

United States Patent Office 2,976,729
Patented Mar. 28, 1961

2,976,729

VOLTAGE COMPARATOR CIRCUITRY

James L. Smith, Lakewood, Calif., assignor to Leonard Electronics, Inc., Montebello, Calif., a corporation of California Filed June 30, 1958, Ser. No. 745,682

8 Claims. (Cl. 73—342)

The present invention relates generally to circuitry for the measurement of electrical resistance, particularly as applied to the measurement of temperature and temperature changes.

In its preferred form arranged for the measurement of temperature, circuitry in accordance with the present invention may include E.M.F. source means comprising a pair of E.M.F. sources connected in series or, alternatively, a single E.M.F. source with an intermediate tap, preferably but not necessarily a center tap. Resistive elements are connected in series across the E.M.F. source means, the resistive elements including desirably two resistors having a relatively low, preferably virtually zero temperature resistance coefficient and a third resistor desirably having a temperature resistance coefficient of relatively high absolute value, either positive or negative. A current-indicating device such as a microammeter is connected across one of the E.M.F. sources and one of the resistors of low temperature coefficient. The other of the two resistors having a low temperature coefficient and the resistor having a high temperature coefficient are connected across the other E.M.F. source and the indicating device. Suitable switch means may be provided in series with the meter. With the circuit as thus arranged the meter will indicate by its deflection the voltage unbalance across it, and the resistors are so chosen that such deflection is zero when the high temperature coefficient resistor is at some predetermined temperature. When such resistor changes in temperature, the value of current flow through the meter, or its deflection, is a measure of the changed temperature. For convenience and accuracy of reading the meter, it is desirable that the indication yielded by the device be substantially linearly related to the temperature being sensed by the resistor of high temperature coefficient. In a preferred specific construction in accordance with the present invention, this is accomplished by using, for the resistor of high temperature coefficient, a thermistor having a resistance of the same order of magnitude as the low coefficient resistors and, for a limited temperature range, a virtually constant, high temperature coefficient of several percent per degree Fahrenheit. The present device is particularly well suited for the accurate measurement of body temperature as existing, for example, in one of the body orifices.

The principles underlying the present invention are applicable also in the operation of a temperature differential measuring device. In accordance with such a device, the circuit as described hereinabove is modified by the addition of a second resistor having a relatively high temperature coefficient. The four resistors are so arranged that one of the high temperature coefficient resistors and one of the low temperature coefficient resistors are connected in series across the current-indicating device and one of the sources of E.M.F., while the other resistors are connected in series across the current indicating device and the other source of E.M.F.; these circuits are thus effectively symmetrical. Under these conditions the system is so arranged that the total resistance of the two resistors in series in one branch of the circuit is virtually equal to the total resistance of the two resistors in the other branch of the circuit.

Moreover, in accordance with the present invention, the two circuits described above may be effectively used together, thus making a composite meter for the indicating of temperature and of temperature differential, such information being desirable in the healing arts for certain diagnostic procedures. Furthermore, it is within the contemplation of the present invention to provide apparatus wherein certain of the components of the device as described above may be physically incorporated into a sensing rod or probe which may be readily removable from electrical and mechanical connection with the portions of the circuit including the current-indicating device and the sources of E.M.F. This arrangement is particularly desirable where temperatures of a large number of persons are to be taken in rapid sequence, as in a hospital. By providing as many sterilized probes as persons, temperatures of all may be measured rapidly by successively removing a probe after each use and replacing it with a freshly sterilized probe. Each removable probe desirably includes a resistor of high temperature coefficient and two resistors of low temperature coefficient, and each probe may thus be calibrated in manufacture by selection of appropriate values for the low coefficient resistors. This is particularly advantageous when the high temperature coefficient resistor is a thermistor, since thermistors presently available display substantial variations from nominal resistance and the circuitry must be hence individually calibrated for each thermistor for most accurate results in use.

Where both temperature and temperature differential are to be measured, two probes are used. One contains the three resistors in accordance with the present invention, the high temperature coefficient resistor being located at the temperature sensing tip. The same probe also contains a high coefficient resistor and, if desired, the associated low coefficient resistor of the temperature differential measuring circuit, the two high coefficient resistors being mounted in adjacent relation whereby to rise and fall in temperature together. The other probe includes a temperature sensing tip containing a high temperature coefficient resistor and may also contain an associated resistor of low temperature coefficient.

Accordingly it is a principal object of the present invention to disclose and provide novel circuitry by which to measure and indicate changes of electric resistance resulting from changes of temperature of resistive elements having relatively high temperature coefficients.

Other objects and purposes of the invention are to disclose a device of the above character employing a resistive element having a relatively high temperature coefficient together with resistive elements having relatively low temperature coefficients; to disclose such circuitry particularly well adapted for use in measuring the temperature and temperature differentials of the human body and provided, when so used, with probe means for sensing temperature, the probe means being detachable from the remaining electrical portions of the circuit to facilitate sterilization; and for other and additional objects and purposes as will become clear from a study of the following described embodiments of the invention taken in connection with the accompanying drawings, in which:

Figure 1:
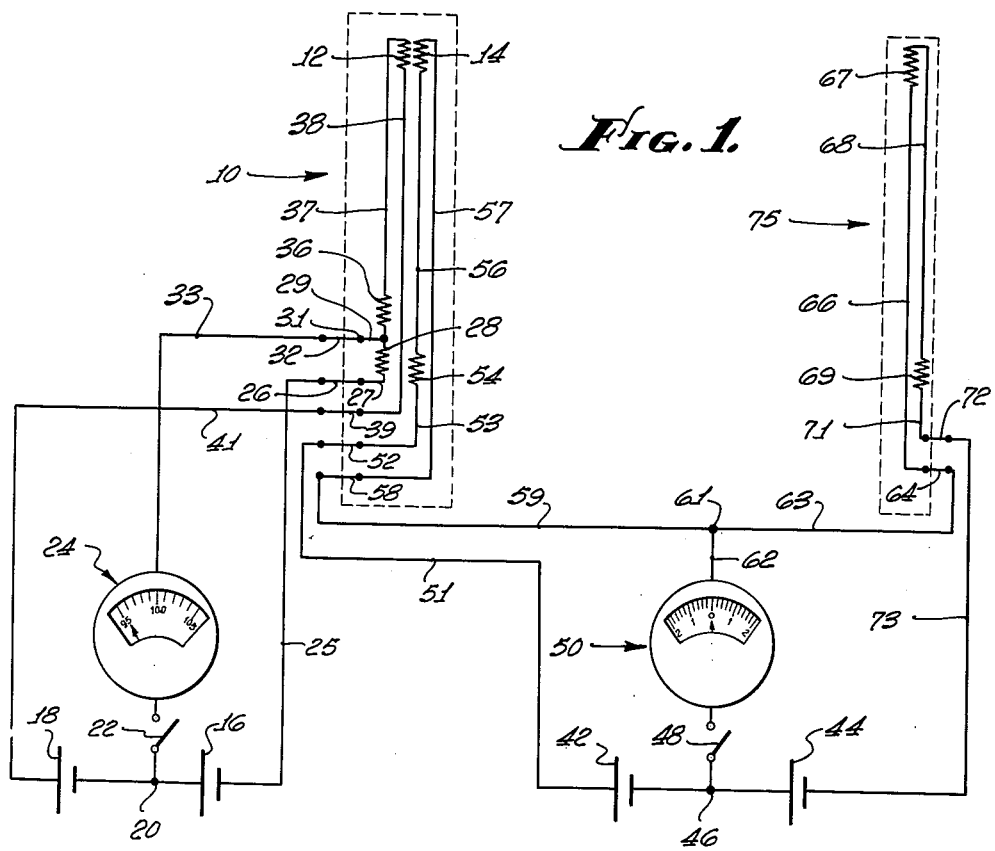
Fig. 1 is a schematic circuit diagram of circuitry in accordance with the present invention for indicating temperature and indicating temperature differential.

Referring now in detail to the drawing, and first to Fig.

1 thereof, there is indicated generally at 10 the outine of a probe provided with temperature-sensing elements comprising electrically resistive components 12 and 14. The circuit at the left as seen in Fig. 1, of which resistor 12 is a part, includes E.M.F. source means here shown as comprising a pair of E.M.F. sources 16 and 18 connected in series, there being an intermediate terminal 20 which is connected through switch means 22 to one terminal of a current-indicating device such as microammeter indicated generally at 24. Source 16 is connected through lead 25, junction element 26 and lead 27 to resistor 28, the other end of the resistor being connected through lead 29 to terminal 31 and thence through junction element 32 and lead 33 to the other terminal of meter 24. Lead 29 is connected through resistor 36, lead 37, resistor 12, lead 38, junction element 39 and lead 41 to the terminal of E.M.F. source 18 opposite to the intermediate terminal 20.

At the right in the representation of Fig. 1 there is a second circuit, of which the resistor 14 is a part. In this circuit, there is provided E.M.F. source means here shown as comprising a pair of E.M.F. sources 42 and 44 connected together in series through an intermediate junction 46, the latter junction being connected through a switch 48 to one terminal of a current-indicating device indicated generally at 50, desirably a microammeter of the type whose position at rest is with the needle in the center or zero position and capable of indicating flow of current therethrough by deflecting to the left or right from such zero point depending upon the direction of current flow.

The terminal of E.M.F. source 42 opposite to the intermediate terminal 46 is connected through lead 51, junction element 52, lead 53, resistor 54 and lead 56 to one side of the resistor 14 previously referred to. The other side of the resistor 14 is connected through lead 57, junction element 58 and lead 59 to terminal 61, the latter point being connected through lead 62 to the other terminal of the meter 50. Terminal 61 is also connected through lead 63, junction element 64 and lead 66 to resistor 67, the other end of the latter named resistor being connected through lead 68 to a resistor 69 and thence through lead 71, junction element 72 and lead 73 to the terminal of E.M.F. source 44 opposite to the terminal 46. Resistors 67 and 69 and their connecting leads are desirably incorporated in a probe as indicated generally by the dotted outline 75.

The circuitry of Fig. 1 is intended to measure the temperature of resistor 12 and the temperature differential between resistors 14 and 67. It is important that resistors 12 and 14 be at the same temperature, both together constituting a first temperature-sensing means and resistor 67 constituting the second temperature-sensing means.

Figure 2:
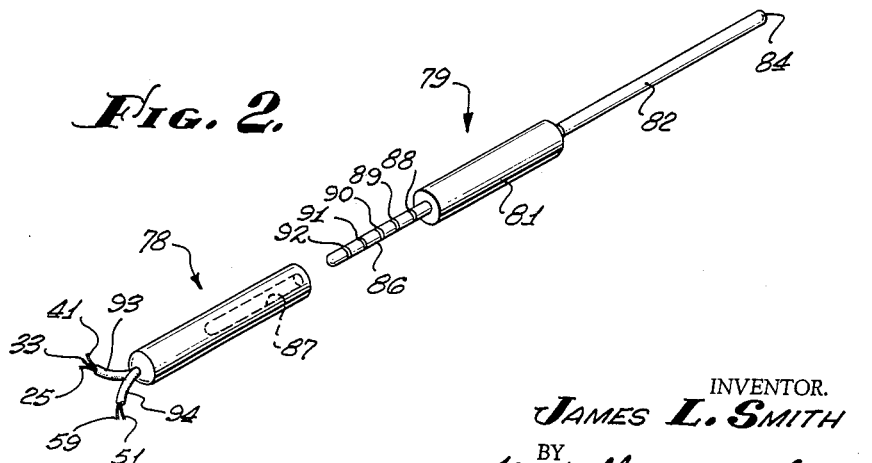
Fig. 2 is a perspective view of a probe in accordance with the present invention, the probe prong being shown disengaged from the probe socket.

The circuitry of the present invention is particularly advantageous when used in conjunction with apparatus providing for a number of detachable individual probes including temperature-sensing means for the measurement of the temperature of portions of the human body. Such application requires sterilization of the temperature-sensing means after each use. This is readily done in the preferred form of the present invention. In Fig. 2 there is illustrated an apparatus made up of a base indicated generally at 78 and a detecting member indicated generally at 79. The latter structure includes a handle portion 81 and, projecting longitudinally therefrom, an elongated probe 82 terminating in a temperature-sensing tip 84. Projecting downwardly from handle 81 there is a male connector element or prong 86 receivable in a cylindrical bore or socket 87 formed in the base 78. The prong 86 is provided with a number of spaced annular metallic members 88, 89, 90, and 91, and 92, insulated from one another, and each adapted to make contact with an individual electrically conductive member within the socket bore 87 in known manner. It will be seen that contacts made by these annular metallic members correspond to junction elements 32, 26, 39, 52 and 58 respectively schematically shown in Fig. 1. Leading from base 78 are cables 93 and 94 fragmentarily shown in Fig. 2, cable 93 including leads 25, 33 and 41 and cable 94 including leads 51 and 59.

A principal advantage of the present invention is the fact that temperature indication deflections of the microammeter 24 are virtually linear with changes of temperature of the temperature-sensing portion of the circuit, including resistor 12, at least over a wide enough range for accurate clinical use in measuring the temperature of the body. Similarly, deflections of microammeter 50 are also virtually linear with temperature differences between resistors 14 and 67. Resistors 12, 14 and 67 should have very high temperature coefficients, and thermistors are preferred on that account. Preferably within each of the comparator circuits in accordance with the present invention, the two sources of E.M.F. are of equal value. In a preferred design, the sources are mercury cells, such as Mallory mercury cells, each cell having an electromotive force of approximately 1.345 volts. In the circuit for measuring temperature, as in the left portion of the circuit diagram of Fig. 1, the resistors 28 and 36 are of very low, preferably virtually zero, temperature coefficient. When the E.M.F. sources 16 and 18 are of the same voltage, as is preferred, it will be seen that a null indication of the microammeter 24 will be given when the total resistance of the E.M.F. source 16 and resistor 28 is equal to the total resistance of the E.M.F. source 18, resistor 36 and resistor 12. In a preferred form of the invention satisfactory operation results when the resistor 12 is a thermistor having a resistance of 1200 ohms at a temperature of 95° F. and a temperature coefficient of the order of several percent per degree Fahrenheit. Resistors 28 and 36 should then differ in resistance by the resistance of the resistor 12, and in a typical construction the resistance of the resistor 36 may be 500 ohms, the resistance of resistor 28 being consequently 1700 ohms. It is to be distinctly understood that the values above mentioned are exemplary only of typical values for an operative device made in accordance with the present invention.

In the case of the temperature differential circuitry seen in the right portion of Fig. 1, good results in terms of linearity of response by the meter 50 will be obtained when the temperature responsive resistors 14 and 67 have resistances which are equal and desirably of the same order of magnitude but preferably somewhat greater than the resistances of each of the low temperature coefficient resistors 54 and 69. Thus in a typical operative circuit embodying this form of the present invention, resistors 54 and 69 are equal in value, each having a resistance of approximately 800 ohms. The temperature-sensing resistors 14 and 67 are equal in value to one another, each having a resistance of approximately 1200 to 1400 ohms at a predetermined temperature within the operating range, desirably midway of the range. E.M.F. sources 42 and 44 are preferably of substantially identical characteristics and are desirably Mallory mercury cells, like sources 16 and 18, each having an E.M.F. of approximately 1.345 volts. The electrical indicating devices 24 and 50 are here illustratively shown as ammeters, but it will be understood that any device capable of indicating a voltage difference between the points to which the meters are connected would yield meaningful results.

The circuitry in accordance with the present invention is characterized by very high and constant accuracy after initial calibration. Moreover, the circuit is particularly well adapted to being miniaturized. When the device is made as has been set forth hereinabove, with a removable probe means, it will be noted that with the probe means removed the circuitry is interrupted so that no drain of current from any of the E.M.F. sources takes place. Current used in operation is very small, and consequently the meter or meters may be located at relatively long distances from the probes without substantially diminishing accuracy. When the device is used for the measurement of temperatures of parts of the human body or the like and the individual probes so used must be sterilized between uses on successive individuals, such sterilization is readily accomplished at high temperatures with the present device, since the probes themselves can be subjected to high sterilizing temperatures without harm, in contrast to such devices as mercurial thermometers and the like.

Accordingly it will be seen that there is here presented novel circuitry adapted for the measurement of temperatures or the measurement of temperature differentials, with particular application to clinical use in the medical field. For convenience of nomenclature it is to be noted that "temperature coefficient" and "temperature resistance coefficient" are used synonymously herein.

Modifications and changes from the specific forms and values of the circuit components hereinabove discussed and identified are contemplated and are intended to be included within the scope of the invention as defined in the appended claims.

I claim:

1. In a temperature responsive device, in combination: a temperature-measuring circuit comprising first and second E.M.F. sources connected in series; a first resistor and a first electrical indicating device in series across the first source; second and third resistors in series across the indicating device and second source, said first and second resistors having relatively small temperature coefficients and said third resistor having a temperature coefficient of relatively large absolute value; a temperature comparing circuit comprising third and fourth E.M.F. sources connected in series, fourth and fifth resistors and a second electrical indicating device across said third source, and sixth and seventh resistors across said second indicating device and fourth source, said fourth and sixth resistors having relatively small temperature coefficients and said fifth and seventh resistors having temperature coefficients of relatively large absolute value, said third and fifth resistors being disposed together and constituting together a first temperature-sensing means, said seventh resistor constituting a second temperature-sensing means.

2. The invention as stated in claim 1 wherein the temperature coefficient of the third resistor is negative.

3. The invention as stated in claim 1 wherein the temperature coefficients of the fifth and seventh resistors are negative.

4. The invention as stated in claim 1 wherein the temperature coefficients of the third, fifth and seventh resistors are negative, and the coefficients of the fifth and seventh resistors are virtually equal.

5. The invention as stated in claim 4 wherein said first and second E.M.F. sources are of equal voltage.

6. The invention as stated in claim 4 wherein said first and second E.M.F. sources are of equal voltage and said third and fourth E.M.F. sources are of equal voltage.

7. The invention as stated in claim 1 wherein the resistance of the first resistor is equal to the sum of the resistance of the third resistor at a predetermined temperature within the range of the temperature responsive device and the resistance of the second resistor.

8. The invention as stated in claim 1 wherein the resistances of the fourth and sixth resistors are substantially equal and of the same order of magnitude as the resistances of the fifth and seventh resistors.

References Cited in the file of this patent

UNITED STATES PATENTS

| | | |
|---|---|---|
| 1,238,468 | Wilsey | Aug. 28, 1917 |
| 1,460,530 | Brown et al. | July 3, 1923 |
| 2,649,571 | Smith | Aug. 18, 1953 |
| 2,683,245 | Wunsch | July 6, 1954 |
| 2,686,293 | Davis | Aug. 10, 1954 |
| 2,816,997 | Conrad | Dec. 17, 1957 |